(12) United States Patent
Kim et al.

(10) Patent No.: US 11,731,079 B2
(45) Date of Patent: Aug. 22, 2023

(54) METHOD AND APPARATUS FOR TREATING EXHAUST GAS

(71) Applicants: HYUNDAI MOTOR COMPANY, Seoul (KR); KIA CORPORATION, Seoul (KR); KOREA INSTITUTE OF INDUSTRIAL TECHNOLOGY, Cheonan-si (KR)

(72) Inventors: Kyoung Hye Kim, Suwon-si (KR); Su Han Kim, Ulsan (KR); Hyun Woo Kang, Ulsan (KR); Jun Choi, Pohang-si (KR)

(73) Assignees: HYUNDAI MOTOR COMPANY, Seoul (KR); KIA CORPORATION, Seoul (KR); KOREA INSTITUTE OF INDUSTRIAL TECHNOLOGY, Cheonan-si (KR)

( * ) Notice: Subject to any disclaimer, the term of this patent is extended or adjusted under 35 U.S.C. 154(b) by 0 days.

(21) Appl. No.: 17/715,431

(22) Filed: Apr. 7, 2022

(65) Prior Publication Data
US 2023/0211285 A1 Jul. 6, 2023

(30) Foreign Application Priority Data
Jan. 6, 2022 (KR) .......................... 10-2022-0002366

(51) Int. Cl.
*F23G 7/06* (2006.01)
*B01D 53/72* (2006.01)
*B01D 53/76* (2006.01)

(52) U.S. Cl.
CPC .............. *B01D 53/72* (2013.01); *B01D 53/76* (2013.01); *F23G 7/068* (2013.01); *B01D 2251/102* (2013.01); *B01D 2251/104* (2013.01); *B01D 2257/708* (2013.01); *B01D 2258/0258* (2013.01); *B01D 2258/0266* (2013.01); *B01D 2258/0275* (2013.01); *B01D 2258/0291* (2013.01); *B01D 2259/818* (2013.01); *F23G 2209/14* (2013.01)

(58) Field of Classification Search
CPC ................... B01D 53/72; B01D 53/76; B01D 2257/708; B01D 2259/818; B01D 2251/104; B01D 2258/0258; B01D 2258/0266; B01D 2258/0275; B01D 2258/0291; B01D 2251/102; F23G 7/068; F23G 2209/14
See application file for complete search history.

(56) References Cited

U.S. PATENT DOCUMENTS

| | | | |
|---|---|---|---|
| 5,297,954 A | 3/1994 | Colagiovanni | |
| 2005/0079112 A1* | 4/2005 | Li | B01J 19/088 423/213.2 |
| 2019/0030477 A1* | 1/2019 | Shatalov | F02M 25/12 |

FOREIGN PATENT DOCUMENTS

| | | | | |
|---|---|---|---|---|
| CN | 107 042 039 A | * | 8/2017 | |
| CN | 110 327 738 A | * | 10/2019 | |
| CN | 110327738 A | | 10/2019 | |
| CN | 110 624 372 A | * | 12/2019 | ........... B01D 53/323 |
| CN | 113 996 440 A | * | 2/2022 | ............. B03C 3/017 |
| JP | 2004-041884 A | | 2/2004 | |
| JP | 2004-125329 A | | 4/2004 | |
| JP | 5744488 B2 | | 7/2015 | |
| KR | 10-0492475 B1 | | 6/2005 | |
| KR | 10-0603810 B1 | | 7/2006 | |
| KR | 10-1580235 B1 | | 12/2015 | |
| KR | 10-1580231 B1 | | 1/2016 | |
| KR | 10-1831681 B1 | | 4/2018 | |
| WO | WO 2004 112 940 A1 | * | 12/2004 | |
| WO | WO 2019 132 539 A1 | * | 7/2019 | ............. B01D 53/75 |

\* cited by examiner

*Primary Examiner* — Timothy C Vanoy
(74) *Attorney, Agent, or Firm* — McDonnell Boehnen Hulbert & Berghoff LLP

(57) ABSTRACT

The present disclosure relates to a method for treating exhaust gas including a plasma reaction operation of reacting exhaust gas containing a volatile organic compound (VOC) with low-temperature plasma to generate exhaust gas containing a VOC-derived intermediate, and a combustion operation of combusting the exhaust gas containing the VOC-derived intermediate to produce carbon dioxide and water.

11 Claims, 2 Drawing Sheets

METHOD AND APPARATUS FOR TREATING EXHAUST GAS

CROSS REFERENCE TO RELATED APPLICATIONS

This application claims the benefit of priority to Korean Patent Application No. 10-2022-0002366, filed in the Korean Intellectual Property Office on Jan. 6, 2022, the entire contents of which are incorporated herein by reference.

TECHNICAL FIELD

The present disclosure relates to a method for treating exhaust gas containing a volatile organic compound with lower energy cost than a conventional method, and an apparatus for treating the exhaust gas.

BACKGROUND

A volatile organic compound (VOC) is generated in various places, such as a sewage treatment plant, an incinerator, a food waste treatment facility, a landfill, an oil refinery, a chemical plant, a manure and livestock wastewater treatment plant, and the like. Such VOC is known to cause air pollution by volatilizing easily into an atmosphere at a room temperature because of a high vapor pressure thereof. Further, the VOC has inherent biotoxicity and chemical reactivity, so that the VOC is known to cause various types of environmental problems, for example, a creation of an ozone layer in a troposphere and a cause of stratospheric destruction, an occurrence of a greenhouse effect, generation of odors, and the like. Furthermore, the VOC not only stimulates a nervous system of a person by a bad odor to cause discomfort, but is also harmful to a human body and causes many problems up to a decrease in efficiency or an increase in safety accidents resulted from a decrease in concentration.

In particular, among VOCs generated in a painting process, VOCs generated in a painting process of a building, an automobile, and an electronic product are emitted in a very large amount to about 10% to 20% of anthropogenic VOC emission. However, because the VOCs generated in the painting process are generated in a form of fugitive emission, it was not easy to remove such VOCs or prevent such VOCs from occurring.

As a solution for this, Korean Patent No. 1831681 discloses a volatile organic compound removal system including a treating portion that adsorbs and desorbs a volatile organic compound from exhaust gas containing the volatile organic compound (VOC), a reactor that burns and removes the volatile organic compound desorbed by the treating portion by a high temperature of plasma, and a scrubber that reduces a nitrogen oxide (NOx) produced by burning the volatile organic compound in the reactor and then discharges the reduced nitrogen oxide to the outside. However, when the high-temperature plasma is used as in the Patent Document 1, there is a disadvantage in that a large amount of energy is consumed to generate the high-temperature plasma, and thus an operation cost is high.

Therefore, there is a need for research and development on a method for treating the exhaust gas containing the volatile organic compound with lower energy cost than a conventional method, and an apparatus for treating the exhaust gas.

SUMMARY

The present disclosure has been made to solve the above-mentioned problems occurring in the prior art while advantages achieved by the prior art are maintained intact.

An aspect of the present disclosure provides a method capable of effectively treating exhaust gas containing a volatile organic compound with lower energy cost than a conventional method using low-temperature plasma, and an apparatus for treating the exhaust gas using the method.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method for treating exhaust gas includes a plasma reaction operation of reacting exhaust gas containing a volatile organic compound (VOC) with low-temperature plasma to generate exhaust gas containing a VOC-derived intermediate, and a combustion operation of combusting the exhaust gas containing the VOC-derived intermediate to produce carbon dioxide and water.

According to another aspect of the present disclosure, an apparatus for treating exhaust gas includes a plasma reaction portion for reacting low-temperature plasma with exhaust gas containing a volatile organic compound (VOC) to generate exhaust gas containing a VOC-derived intermediate, and a combustion reaction portion for combusting the exhaust gas containing the VOC-derived intermediate to produce carbon dioxide and water.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
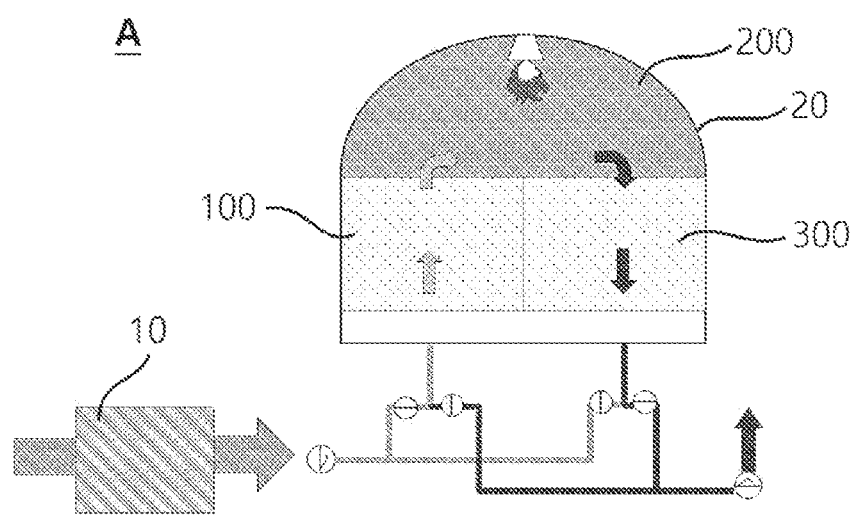
FIG. 1 is a cross-sectional schematic diagram of an exhaust gas treating apparatus according to an embodiment of the present disclosure.

A method for treating exhaust gas according to the present disclosure includes a plasma reaction operation and a combustion operation.

Plasma Reaction Operation

In the present operation, exhaust gas containing a volatile organic compound (VOC) is reacted with low-temperature plasma to generate exhaust gas containing a VOC-derived intermediate. By reacting the exhaust gas containing the VOC with the low-temperature plasma before the combustion operation, a portion of the VOC in the exhaust gas is removed, and a portion of the remaining VOC reacts with the low-temperature plasma to be converted into the VOC-derived intermediate having a low reaction energy. For this reason, the VOC may be removed even when the combustion operation, which is a next operation, is performed at a lower temperature than before, so that there is an effect of reducing an energy cost.

Generally, the low-temperature plasma may be generated by a method for generating the low-temperature plasma, and may be, for example, generated by dielectric barrier discharge (DBD). The low-temperature plasma generated by the DBD may have a relatively low electron density, but have a large discharge area to treat a large flow rate, thereby having an excellent VOC removal rate even with low power consumption.

Further, the low-temperature plasma may have a temperature in a range from 15 to 150° C., more specifically, in a range from 25 to 80° C. When the temperature of the low-temperature plasma is within the range, a reaction efficiency of the plasma and the VOC is increased, thereby improving the VOC removal rate.

The low-temperature plasma may be plasma containing at least one selected from a group consisting of nitric oxide (NO), nitrogen ($N_2$), oxygen (O), and ozone ($O_3$). Specifically, the low-temperature plasma may be plasma containing nitric oxide (NO), nitrogen ($N_2$), oxygen (O), and ozone ($O_3$).

Specifically, in the present operation, the portion of the VOC in the exhaust gas containing the VOC may react with the low-temperature plasma to decompose into carbon dioxide and water. The portion of the remaining VOC that has not been decomposed may react with an active material in the low-temperature plasma to be converted into the VOC-derived intermediate. A remaining VOC, which is not decomposed and not converted to the VOC-derived intermediate, may be combusted in the combustion operation, which is the next operation, to be converted into carbon dioxide and water.

The VOC-derived intermediate, which is an intermediate product produced by the reaction of the active material in the low-temperature plasma and the VOC and is a material that is less stable than the VOC, is decomposed even at a low temperature because the reaction energy thereof is lower than that of the VOC.

Further, the exhaust gas containing the VOC-derived intermediate may contain, as described above, the VOC, the VOC-derived intermediate, carbon dioxide, and water.

Combustion Operation

In the present operation, carbon dioxide and water are generated by combusting the exhaust gas containing the VOC-derived intermediate.

Further, in the present operation, the exhaust gas containing the VOC-derived intermediate may be combusted in a temperature range from 600 to 790° C., more specifically, in a temperature range from 640 to 780° C. The temperature at which the exhaust gas containing the VOC is combusted is usually in a range from 820 to 850° C. As described above, the present disclosure is economically feasible as the combustion is possible at a lower temperature by reacting the exhaust gas with the low-temperature plasma and then combusting the exhaust gas.

The combustion operation may be independently performed in a separate unit different from a unit in which the plasma reaction operation is performed after the plasma reaction operation is terminated. That is, the treating method of the present disclosure may be independently performed in the unit in which the plasma reaction operation is performed and the unit in which the combustion operation is performed.

The combustion may be performed using a regenerative thermal oxidizer (RTO). The regenerative thermal oxidizer, which is an apparatus that generally uses hydrocarbon fuel to completely combust the VOC, had an advantage of effectively removing the VOC in a large amount of exhaust gas, but had a disadvantage in that an energy cost to maintain the high temperature in a range from 820 to 850° C. for the combustion is high although the RTO is designed to minimize a heat loss using a heat storage material. Accordingly, the present disclosure made it possible to achieve the complete combustion even at the lower temperature than before by generating the exhaust gas containing the VOC-derived intermediate that lowered the reaction energy of the VOC by the reaction with the low-temperature plasma before the combustion operation.

The treating method of the present disclosure may further include an operation of preheating the exhaust gas containing the VOC before the plasma reaction operation.

Preheating Operation

In the present operation, the exhaust gas containing the VOC is preheated. By preheating the exhaust gas containing the VOC, the reaction efficiency of the plasma and the VOC may be increased, thereby improving the VOC removal rate.

In this connection, the preheating may use a conventionally available preheating method without particular limitation, and may be, for example, performed using an electric heater, steam, high temperature gas, and the like.

The preheating may be performed to a temperature of the exhaust gas in a range from 15 to 150° C., more specifically, from 25 to 50° C. When the temperature of the preheated exhaust gas is within the range, there is an effect of improving the VOC removal rate. When the temperature of the preheated exhaust gas is less than the range, a portion of the VOC may be adsorbed to a plasma electrode to prevent plasma generation. When the temperature of the preheated exhaust gas exceeds the range, reactivity of the plasma and the VOC may decrease, thereby reducing a VOC removal efficiency.

Further, an apparatus for treating exhaust gas according to the present disclosure includes a plasma reaction portion, and a combustion reaction portion.

Plasma Reaction Portion

The plasma reaction portion reacts the low-temperature plasma with the exhaust gas containing the volatile organic compound (VOC) to generate the exhaust gas containing the VOC-derived intermediate. In this connection, the plasma reaction portion reacts the exhaust gas containing the VOC with the low-temperature plasma before the combustion reaction portion, thereby removing the portion of the VOC in the exhaust gas, and reacting the portion of the remaining VOC with the low-temperature plasma to convert the portion of the remaining VOC into the VOC-derived intermediate with the low reaction energy. For this reason, the VOC may be removed even when the combustion in the combustion reaction portion is performed at the lower temperature than before, thereby reducing the energy cost.

The low-temperature plasma may be generated by the dielectric barrier discharge. Specifically, the treating apparatus may further include a low-temperature plasma generator that generates the low-temperature plasma by the dielectric barrier discharge.

Low-Temperature Plasma Generator

The low-temperature plasma generator generates the low-temperature plasma by the dielectric barrier discharge.

Further, a current applied to the low-temperature plasma generator may be an alternating current (AC). In this connection, the generated low-temperature plasma may have the characteristics and the composition as described in the method for treating the exhaust gas.

A voltage applied to the low-temperature plasma generator may be in a range from 9 to 12 kV, and a frequency of power may be in a range from 4.0 to 6.0 kHz or in a range from 4.5 to 5.5 kHz.

The low-temperature plasma generator may generate the low-temperature plasma by the dielectric barrier discharge.

As described above, when generating the low-temperature plasma by the dielectric barrier discharge, although the electron density is relatively low, it is easy to widen the large discharge area, so that the large flow rate of the exhaust gas may be treated.

Combustion Reaction Portion

The combustion reaction portion generates carbon dioxide and water by combusting the exhaust gas containing the VOC-derived intermediate.

In this connection, the combustion reaction portion may be the regenerative thermal oxidizer. The regenerative thermal oxidizer may be used without any particular limitation as long as it is an RTO apparatus normally used for the VOC treatment, and may include, for example, a preheating portion made of a ceramic thermal storage material, a combustion portion in which the VOC is decomposed by the combustion, and a heat recovery portion made of the ceramic thermal storage material.

Further, the combustion reaction portion may be disposed independently of the plasma reaction portion.

Referring to FIG. 1, an apparatus "A" for treating exhaust gas according to an embodiment of the present disclosure may include a plasma reaction portion 10 and a combustion reaction portion 20. The combustion reaction portion 20 may include a preheating portion 100 made of the ceramic heat storage material, a combustion portion 200 in which the VOC is decomposed by the combustion, and a heat recovery portion 300 made of the ceramic heat storage material.

Further, the exhaust gas treating apparatus according to the present disclosure may further include a preheater for preheating the exhaust gas containing the VOC.

Preheater

The preheater preheats the exhaust gas containing the VOC to increase the reaction efficiency of the plasma and the VOC, thereby improving the VOC removal rate.

The preheating may be performed to the temperature of the exhaust gas in the range from 15 to 150° C., or, from 25 to 50° C. In this connection, the preheating method may not be particularly limited, but, for example, the electric heater, the steam, heat exchange with high-temperature gas, and the like may be utilized.

The method and the apparatus for treating the exhaust gas according to the present disclosure as described above are economical because the energy cost is reduced using the low-temperature plasma compared to a conventional method using high-temperature plasma. Further, as the exhaust gas is combusted after reacting with the low-temperature plasma, even when the temperature in the combustion operation is lowered, the combustion is possible, thereby reducing a cost of the combustion.

Hereinafter, a detailed description will be achieved with Examples and the like to help understand the present disclosure. However, Examples according to the present disclosure may be modified in various other forms, and the scope of the present disclosure should not be construed as being limited to the following Examples. Examples of the present disclosure are provided to more completely describe the present disclosure to a person with average knowledge in the field to which the present disclosure belongs.

EXAMPLES

Example 1. Toluene Removal

As shown in Table 1 below, while adjusting the flow rate of the exhaust gas, power consumption of the plasma generator, and the temperature of the low-temperature plasma, a temperature required when removing 95% of input toluene was measured. A result thereof is shown in Table 1.

Specifically, as shown in FIG. 1, the exhaust gas treating apparatus in which the plasma reaction portion 10 for reacting the low-temperature plasma with the exhaust gas containing the VOC, and the combustion reaction portion 20 for combusting the exhaust gas containing the VOC-derived intermediate are sequentially installed was used. In this connection, in the plasma reaction portion 10, as the exhaust gas containing the VOC was flowed to a section in which the low-temperature plasma is generated, the exhaust gas containing the VOC was reacted with the low-temperature plasma.

Further, before the plasma reaction portion 10, the exhaust gas containing the VOC was preheated to 28° C. with the preheater. Further, the exhaust gas was used after being diluted with air such that a toluene concentration becomes 100 ppm. Furthermore, an experiment was conducted while injecting the exhaust gas containing the VOC at a flow rate of 5 L/min or 10 L/min. The concentration of toluene was measured using a gas chromatograph (GC) apparatus. In addition, a toluene removal rate was calculated by measuring a change in the concentration of toluene before and after the reaction.

The low-temperature plasma was generated in the low-temperature plasma generator that generates the plasma by the dielectric barrier discharge.

Further, as the low-temperature plasma generator, aluminum was used for an internal electrode, a quartz tube was used as a dielectric, and a stainless steel mesh form was used for an external electrode. The plasma was generated by applying a voltage in a range from 9 to 12 kV and applying an alternating current (AC) with a frequency of 5 kHz. In this connection, a removal performance of the toluene, which is the VOC, was evaluated by changing the applied voltage of the low-temperature plasma generator. Further, a monitor capacitor was installed to measure the power consumption in the low-temperature plasma generator. In this connection, after calculating a displacement current through a voltage of the monitor capacitor, average power consumption was calculated.

Figure 2:
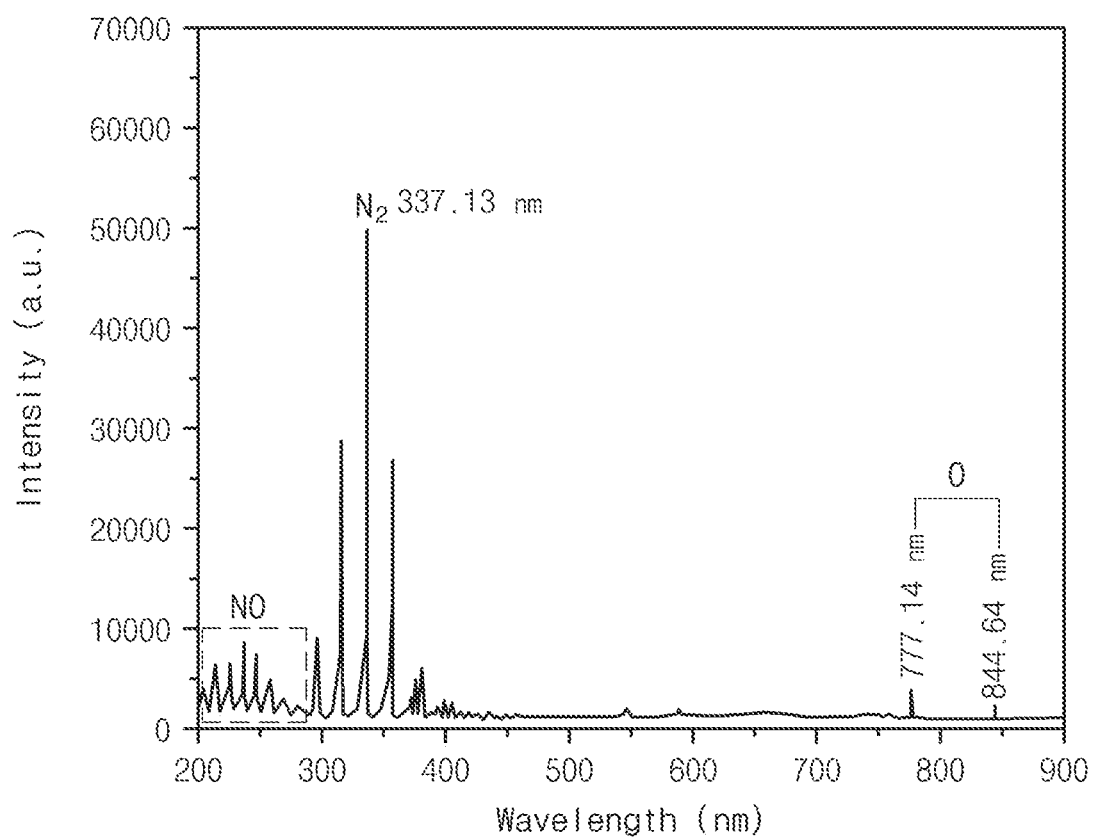
FIG. 2 is a result of analyzing low-temperature plasma used in an embodiment of the present disclosure with an optical emission spectroscopy.

Further, the low-temperature plasma in the plasma reaction portion was analyzed using an optical emission spectroscopy, and a result thereof is shown in FIG. 2. As shown in FIG. 2, NO may be identified in a wavelength range from 210 to 270 mm, $N_2$ may be identified at a wavelength of 337.13 nm, O may be identified at wavelengths of 777.14 mm and 844.64 mm.

TABLE 1

| | | | | | | |
|---|---|---|---|---|---|---|
| Flow rate (L/min) of exhaust gas | | 10 | | | 5 | |
| Power consumption (w) of low-temperature plasma generator | 4 | 8 | 12 | 12 | | |
| Temperature (° C.) of low-temperature plasma | Room temperature | Room temperature | Room temperature | Room temperature | 113 | 188 |
| Toluene removal rate (%) of when only reaction with low-temperature plasma is performed | 20 | 33.9 | 41.3 | 30.2 | 41.8 | 65 |

TABLE 1-continued

| | | | | | | | |
|---|---|---|---|---|---|---|---|
| Required temperature (° C.) required when removing 95% of toluene | RTO alone | 820 | 820 | 820 | 750 | 750 | 750 |
| | RTO after reaction with low-temperature plasma (the present disclosure) | 780 | 760 | 750 | 615 | 670 | 680 |
| Temperature reduction (° C.) of the present disclosure compared to case using RTO alone | | 40 | 60 | 70 | 135 | 80 | 70 |

As shown in Table 1, it may be seen that a VOC removal efficiency at the room temperature increased as the power consumption of the low-temperature plasma generator increased, and reduction in the reaction temperature also increased compared to that in the case using the RTO apparatus alone. Further, the method according to the present disclosure (the RTO after the reaction with the low-temperature plasma) achieved a toluene removal rate equal to or higher than 95% at a lower temperature than the case using the RTO alone of performing the combustion only.

The method for treating the exhaust gas according to the present disclosure is economical because the energy cost is reduced using the low-temperature plasma compared to the conventional method using the high-temperature plasma. Further, as the exhaust gas is combusted after reacting with the low-temperature plasma, even when the temperature in the combustion operation is lowered, the combustion is possible, thereby reducing the cost of the combustion.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A method for treating exhaust gas, the method comprising:
   a plasma reaction operation comprising reacting exhaust gas containing a volatile organic compound (VOC) with low-temperature plasma to generate exhaust gas containing a VOC-derived intermediate;
   a combustion operation comprising combusting the exhaust gas containing the VOC-derived intermediate to produce carbon dioxide and water; and
   before the plasma reaction operation, an operation of preheating the exhaust gas containing the volatile organic compound (VOC) to have a temperature in a range from 15° C. to 150° C.

2. The method of claim 1, wherein the low-temperature plasma has a temperature in a range from 15 to 150° C.

3. The method of claim 1, wherein the low-temperature plasma is generated by dielectric barrier discharge.

4. The method of claim 1, wherein the low-temperature plasma includes plasma containing at least one selected from a group consisting of nitric oxide (NO), nitrogen ($N_2$), oxygen (O), and ozone ($O_3$).

5. The method of claim 1, wherein the combustion operation combusts the exhaust gas containing the VOC-derived intermediate at a temperature range from 600 to 790° C.

6. The method of claim 1, wherein the combustion operation is independently performed in a separate unit different from a unit where the plasma reaction operation is performed after the plasma reaction operation is terminated.

7. The method of claim 6, wherein the combustion operation is performed using a regenerative thermal oxidizer.

8. An apparatus for treating exhaust gas, the apparatus comprising:
   a plasma reaction portion configured to react low-temperature plasma with exhaust gas containing a volatile organic compound (VOC) to generate exhaust gas containing a VOC-derived intermediate; and
   a combustion reaction portion configured to combust the exhaust gas containing the VOC-derived intermediate to produce carbon dioxide and water; and
   a preheater for preheating the exhaust gas containing the volatile organic compound.

9. The apparatus of claim 8, further comprising:
   a low-temperature plasma generator for generating the low-temperature plasma by dielectric barrier discharge.

10. The apparatus of claim 8, wherein the combustion reaction portion is disposed independently of the plasma reaction portion.

11. The apparatus of claim 8, wherein the combustion reaction portion is a regenerative thermal oxidizer.

* * * * *